Aug. 29, 1961     I. W. KLEIN     2,997,894
GEAR CASE

Filed Aug. 4, 1958     2 Sheets-Sheet 1

INVENTOR:
Iven W. Klein,
Bair, Freeman & Molinare
BY     ATTORNEYS.

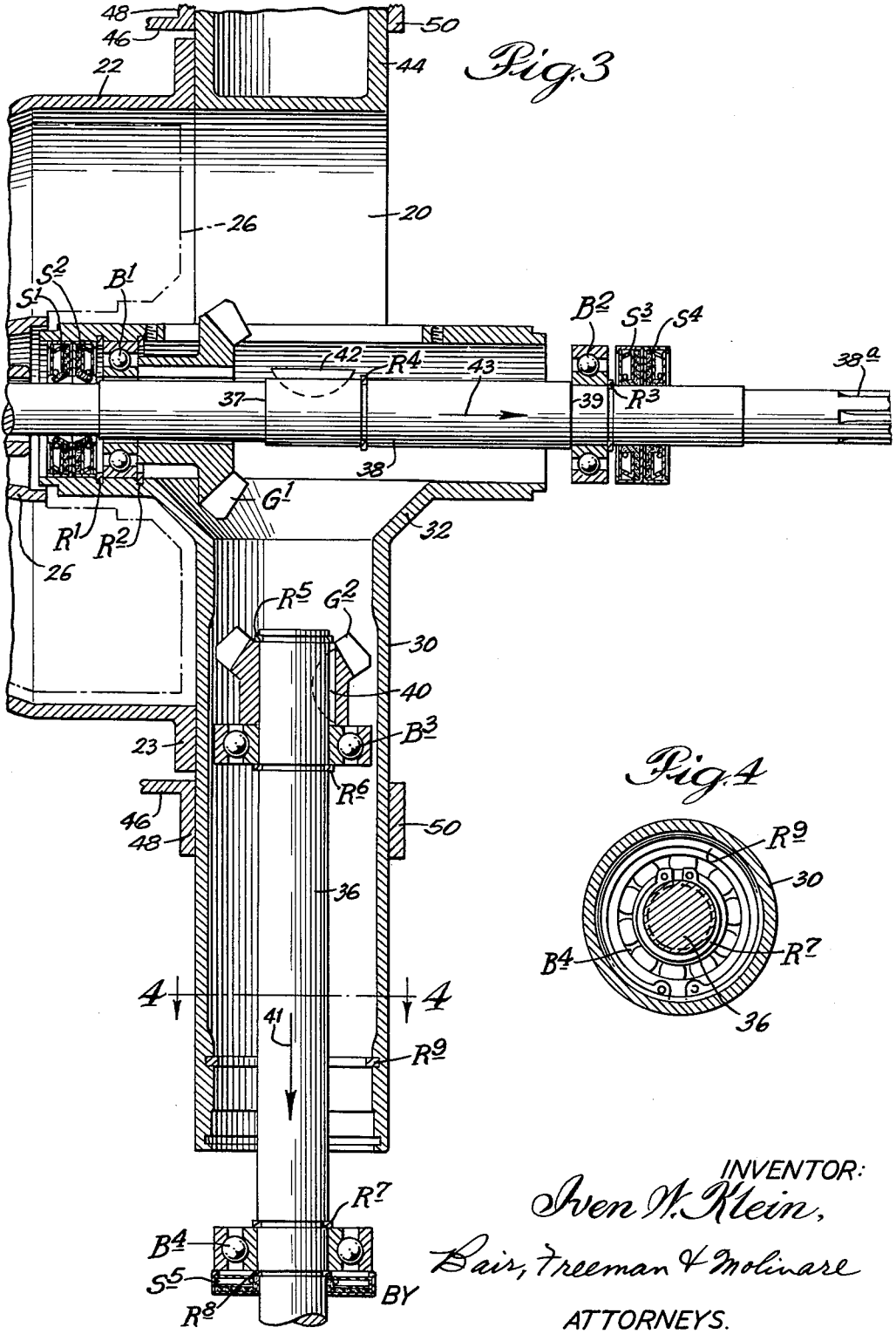

United States Patent Office 2,997,894
Patented Aug. 29, 1961

2,997,894
GEAR CASE
Iven W. Klein, Sioux Falls, S. Dak., assignor to The Sioux Steel Company, Sioux Falls, S. Dak., a corporation of Delaware
Filed Aug. 4, 1958, Ser. No. 752,782
5 Claims. (Cl. 74—606)

This invention relates to a gear case or transmission designed to facilitate the removal of bearings and gears from the transmission for the purpose of replacement when they are worn or broken.

One object of the invention is to provide a transmission particularly suitable for a grain elevator of the auger type such as shown in the copending application of Ralph L. Kooiker and myself, Serial No. 737,836, filed May 26, 1958.

Another object is to provide a transmission with certain bearing, gear and snap ring arrangements which facilitate the removal of a gear and/or bearings from an auger drive shaft enclosed in an inner housing and around which augers rotate within an outer housing.

Still another object is to provide gear, bearing and snap ring arrangements in a drive shaft housing that extends laterally from the inner and outer housings to facilitate the removal of a gear and/or bearings from a main drive shaft without the necessity of having to open the outer or inner housings.

A further object is to provide gear, bearing and snap ring arrangements suitable for any transmission of the type in which shafts extend at an angle to each other and are provided with intermeshing gears which might require replacement.

Still a further object is to provide an arrangement of transmission elements that permit the removal of a bearing and grease seals along with a shaft therefor from one end of a gear housing, the shaft being simultaneously removed from a first gear within the housing and from a bearing and seals at the other end of the housing whereupon the gear may be removed from the housing and replaced with another one into which the shaft is reinserted.

An additional object is to provide simple means for removing a second shaft and its bearings, a second gear and a seal by the removal of a snap ring from a drive shaft housing for the second shaft that retains the entire assembly in position and said second gear in proper mesh with the first gear, one bearing being mounted adjacent the outer end of the drive shaft housing against a second snap ring therein which may be removed after the second shaft is partially withdrawn and the bearing at the inner end of the second shaft as well as the second gear thereon being withdrawable from the drive shaft housing through the bore thereof that normally receives the bearings for the shaft.

With these and other objects in view, my invention consists in the construction, arrangement and combination of the various parts of my gear case or transmission, whereby the objects above contemplated are attained, as hereinafter more fully set forth, pointed out in my claims and illustrated in detail on the accompanying drawings, wherein:

FIG. 1 is a side elevation of a transmission embodying my invention and showing it interposed in a grain elevator of the type shown in the copending application above referred to and driven from an internal combustion engine;

FIG. 2 is an enlarged sectional view on the line 2—2 of FIG. 1 showing internal details of construction of the transmission;

FIG. 3 is a view somewhat similar to FIG. 2 showing certain stages in the disassembly of the transmission in accordance with my invention; and FIG. 4 is a detail sectional view on the line 4—4 of FIG. 3.

On the accompanying drawings I have used the reference numeral 10 to indicate a lower auger housing and 12 an upper auger housing which constitute a grain elevator, the augers therein being indicated at 14 and 16 respectively. Interposed between the auger housings 10 and 12 is my transmission including an outer housing comprising a center housing section 20 and a pair of generally conical end housing sections 22 and 24. The sections 20, 22 and 24 constitute an enlargement in the elevator housing 10—12 to contain the necessary gears for internally driving the augers 14 and 16 as well as an impelling auger 26 and a receiving auger 28. The sweeps of the augers 26 and 28 are shown by dot-and-dash lines in FIGS. 2 and 3.

The center section 20 is provided with a pair of flanges 21 and the end sections 22 and 24 are provided with flanges 23 and 25 adapted to be bolted to the flanges 21 for assembling the sections 20, 22 and 24 relative to each other. The center section 20 includes a sleeve 30 which constitutes a main drive shaft housing to contain a main drive shaft 36 journalled therein as will hereinafter be described.

The inner end of the sleeve 30 terminates in an inner gear housing 32 having a cover plate 34 and within which are meshing bevel gears $G^1$ and $G^2$. The bevel gear $G^2$ is mounted on the main drive shaft 36 for rotation therewith, a key 40 being provided for this purpose. An auger drive shaft 38 is arranged at right angles to the main drive shaft 36 and suitably journalled in the gear housing 32 as will hereinafter appear and the bevel gear $G^1$ is secured thereto for rotation of the same by a key 42. Both ends of the shaft 38 are splined as indicated at 38ᵃ (right-hand end only being shown in FIGS. 2 and 3), and the augers 14 and 16 wind around shafts which are operatively connected to the opposite ends of the auger drive shaft 38 by being splined to the ends 38ᵃ thereof. The shaft for the auger 16 is shown at 17 in FIG. 2.

A stud 44 projects from the gear housing section 20 at a position opposite from the sleeve 30, and an engine bracket 46 is mounted thereon by means of a pair of hubs 48 rotatable on the sleeve 30 and the stud 44. The hubs are retained thereon by hub caps 50. An engine E is mounted on the engine bracket 46 and has a double V groove engine pulley 52 controlled by a suitable clutch, the handle of which is shown at 54. A belt 56 connects the pulley 52 with a main drive shaft pulley 58 on the main drive shaft 36.

An adjusting rod 70 is pivoted at 71 to a bracket 73 and is threaded through an adjusting hand wheel 72 which is rotatably mounted on the engine bracket 46. The engine E may be adjusted to a level position by manipulation of the hand wheel 72. After adjustment a hand wheel stop 74 may be swung down to a position between the spokes of the wheel to retain the adjustment.

The foregoing is a general description of the grain elevator shown in the copending application above referred to and illustrates one environment wherein my present invention may be used to advantage. Describing now my present invention, bearings $B^1$ and $B^2$ are provided for journalling the auger drive shaft 38 in the inner gear housing 32. The hub of the gear $G^1$ and a shoulder 37 of the shaft 38 are engaged with the bearing $B^1$ due to thrust of the shaft 38 toward the left in FIG. 2 (arrow 35) produced by rotation of the shaft as indicated by the arrow 33 to drive the augers 14, 16, 26 and 28, and thereby propel the grain through the housings 10, 22, 20, 24 and 12 in the direction of the arrow 31. The bearing $B^1$ is a combination radial and thrust to take the thrust exerted by the shaft 38 and the gear $G^1$. A housing snap ring $R^1$ in turn takes the thrust of the gear $G^1$ and the shoulder 37 and a second housing snap ring $R^2$ confines the bearing $B^1$ against axial movement in the housing 32.

The bearing $B^2$ is retained on the shaft 38 against a shoulder 39 thereof by a shaft snap ring $R^3$ and floats axially in the housing 32.

The main drive shaft 36 has thereon a pair of bearings $B^3$ and $B^4$. The bearing $B^3$ is retained along with the gear $G^2$ in a definite position with relation to the inner end of the shaft by means of shaft snap rings $R^5$ and $R^6$. The bearing $B^4$ is retained in a definite relation to the outer end of the shaft 36 by shaft snap rings $R^7$ and $R^8$. The bearing $B^4$ and the seal $S^5$ are retained in a definite position longitudinally of the housing 50 by the housing snap rings $R^9$ and $R^{10}$.

The bearing $B^3$ is the same external diameter or may be smaller than the diameter of the bearing $B^4$ and the gear $G^2$ is the same or less diameter than the bearing $B^3$ so as to be capable of being withdrawn through the bore in the housing 30 provided for the bearing $B^3$.

The shaft 38 is provided with outer seals $S^1$ and $S^4$ to keep dirt and grain out of the bearings $B^1$ and $B^2$, and with inner seals $S^2$ and $S^3$ to keep lubricant within the housing 32. The shaft 36 is provided with a seal $S^5$ to keep foreign matter out of the main drive shaft housing 50.

With a transmission constructed in accordance with the foregoing specification the shafts 38 and 36 and their bearings, seals and gears may be assembled in the following sequence.

The bearing $B^2$ and the snap ring $R^3$ are associated with the shaft 38. The snap ring $R^2$ is mounted in the housing 32 with the bearing $B^1$ against it and the snap ring $R^2$ is then mounted to hold the bearing $B^1$ in place. The gear $G^1$ is placed in the housing 32, before the cover 34 is positioned and before the end housing sections 22 and 24 are mounted on the center housing section 20.

The snap ring $R^4$ is placed on the shaft 38 and the key 42 is located in its key seat in the shaft whereupon the shaft may be inserted from the right side in FIG. 3 and forced through the gear $G^1$ and the bearing $B^1$ until the ring $R^4$ is seated against the gear $G^1$. Both bearings $B^1$ and $B^2$ and the gear $G^1$ are now in their proper operating position.

The grease seals $S^1$, $S^2$, $S^3$ and $S^4$ are forced onto each end of the shaft 38 after which the impelling auger 26 and the receiving auger 28 may be placed on the splined ends $38^a$ of the shaft 38 and the end sections 22 and 24 of the gear housing assembled over the inner gear housing 32 and their flanges 23 and 24 bolted to the flanges 21 of the center section 20, and the resulting assembly appears as in FIG. 2.

In assembling the main drive shaft 36, first the snap ring $R^5$ is mounted thereon, then the bearing $B^3$ and the gear $G^2$ (keyed at 40). The outer end of the shaft 36 receives the snap ring $R^7$, the bearing $B^4$ and the snap ring $R^8$ to complete the main drive shaft assembly. Gear $G^2$ is then entered into the bore of the sleeve 30 and moved toward its final position shown in FIG. 2, and when part way in, the snap ring $R^9$ is mounted in the housing 30 whereupon the assembly is moved further inward to the final position shown in FIG. 2 with the bearing $B^3$ floating axially in its bore and the bearing $B^4$ against the snap ring $R^9$. Next the seal $S^5$ is placed on the shaft and then the snap ring $R^{10}$ is assembled next to the seal and the assembly is completed for operation.

Whenever the gear $G^2$ needs replacement, the shaft 36 can be removed downwardly (arrow 41 in FIG. 3) upon removal of the outer snap ring $R^{10}$ which is on the outside of the grease seal $S^5$ and the bearing $B^4$. This permits the entire assembly of shaft 36, gear $G^2$, bearings $B^3$ and $B^4$ and grease seal $S^5$ to be moved part way out as shown whereupon the inner snap ring $R^9$ can be removed, thus permitting the final removal of the unit for replacement of the gear $G^2$. The snap ring $R^5$ is removed for this purpose whereupon the new gear may be located on the key 40 and held in position by reassembly of the snap ring $R^5$. The parts may then be assembled in the reverse order.

The snap rings $R^7$ and $R^8$ adjacent the outer end of the shaft 36 are on opposite sides of the bearing $B^3$ which bearing is a combination radial and thrust and thus determines the thrust and position of the gear $G^2$ relative to the gear $G^1$.

To remove the shaft 38, the gear $G^1$ the bearings $B^1$ and $B^2$ and the grease seals $S^1$, $S^2$, $S^3$ and $S^4$, the housing section 24 is first removed by unbolting its flange 25 from the flange 21 of the section 20 whereupon the receiving auger 28 may be removed from the shaft 38. Next the shaft is forced from left to right in FIG. 3 (arrow 43) which will force out of the gear housing 32 both seals $S^3$ and $S^4$ and the bearing $B^2$. Continued forcing of the shaft will leave the gear $G^1$, the bearing $B^1$ and both seals $S^3$ and $S^4$ in the housing 32. The gear $G^1$ can now be removed from the housing 32 (through the opening therein left by removal of the cover plate 34) and replaced with a new gear. The parts may then be reassembled in the reverse order and the auger 28 and housing section 24 replaced.

From the foregoing description it will be obvious that I have provided a shaft, bearing, seal, gear and snap ring arrangement that permits ready replacement of the gears $G^1$ and $G^2$ and any of the bearings or seals of the transmission. Those associated with the shaft 38 may be replaced independent of those associated with the shaft 36 with a minimum of downtime for the replacement job. Also, the replacement of parts can be accomplished without damage to any of the five seals illustrated on the drawings. It is important in the maintenance of a transmission of the character disclosed to have a ready means facilitating the replacement of broken gears and the like without having to disassemble all parts of the transmission which would involve considerably more time and expense.

Some changes may be made in the construction and arrangement of the parts of my gear case or transmission without departing from the real spirit and purpose of my invention, and it is my intention to cover by my claims any modified forms of structure or use of mechanical equivalents which may reasonably be included within their scope.

I claim as my invention:

1. In a transmission of the character disclosed, a gear housing, an elongated drive shaft housing extending laterally therefrom, a first shaft in said gear housing and biased axially in one direction under load, a second shaft in said drive shaft housing, a pair of bearings cooperating with each of said housings for supporting each shaft, snap ring means engaging said gear and drive shaft housings for axially locating one of the bearings supporting said first shaft in said gear housing and the outer bearing supporting said second shaft in said drive shaft housing, the other bearing for each of said shafts being axially located on its respective shaft and free to move axially in said gear and drive shaft housings and thereby to be removed axially therefrom upon removal of their shafts from said gear and drive shaft housings, a first gear keyed to said first shaft, a second gear keyed to said second shaft for meshing with said first gear, and a snap ring on said first shaft biased by such load against said first gear whereby it axially engages in said direction that bearing on said first shaft axially located in said gear housing by said snap ring means.

2. In a transmission of the character disclosed, a gear housing, a drive shaft housing extending laterally therefrom, a first shaft in said gear housing, a second shaft in said drive shaft housing, a pair of bearings cooperating with each of said housings for supporting each shaft, double snap ring means engaging said gear housing for axially locating one of the bearings supporting said first shaft in said gear housing, a first gear fixed to said first shaft and engageable under load with said last mentioned bearing to determine the position of said first gear relative to said gear housing, a second gear fixed to said second shaft and meshing with said first gear, snap ring means cooperating with said second gear and said second shaft for retaining said second gear located on said second shaft, and double snap ring means cooperating with one of the bearings supporting said second shaft in said drive shaft housing, with said drive shaft and with said drive shaft housing for retaining said last mentioned bearing on said second shaft and to determine the position of said second gear relative to said gear housing.

3. In a transmission, a gear housing, a drive shaft housing extending laterally therefrom, a first shaft in said gear housing, a second shaft in said drive shaft housing, a pair of bearings cooperating with each of said housings for supporting each shaft, double snap ring means engaging said gear housing for axially locating one of said bearings supporting said first shaft in said gear housing, snap ring means engaging said first shaft and the other bearing supporting said first shaft for axially locating said other bearing on the shaft, said other bearing axially floating in said gear housing and thereby removable with said first shaft therefrom, a first gear keyed to said first shaft, a pair of snap rings engaging said second shaft for locating one of its bearings thereon, said last mentioned bearing axially floating in said drive shaft housing and thereby removable with said second shaft therefrom, two pairs of snap rings engaging said drive shaft housing, said second shaft and the other bearing therefor for axially locating said last mentioned bearing on said second shaft and in the outer end of said drive shaft housing, and a second gear keyed to said second shaft and meshing with said first gear, said two pairs of snap rings determining the mesh of said second gear relative to said first gear.

4. A transmission comprising a gear housing, a drive shaft housing extending laterally therefrom, an auger drive shaft in said gear housing, a second shaft in said drive shaft housing, a pair of bearings cooperating with each of said housings for supporting each shaft, snap ring means engaging said gear housing and one of said bearings supporting said first shaft in said gear housing, snap ring means engaging the other bearing supporting said first shaft, said gear housing and said first shaft itself for axially locating said other bearing on said first shaft and in said gear housing, a first gear keyed to said first shaft and the shaft thrusting thereagainst under the load of material encountered by an auger driven by said auger drive shaft whereby said first bearing receives the thrust of said gear and said second bearing may be removed with said auger drive shaft from said gear housing and from said first gear leaving said first gear in said gear housing so that the gear, after the shaft is removed, may be removed from said gear housing, snap ring means engaging said second shaft, one of said pair of bearings supporting said second shaft and said drive shaft housing for axially locating said last mentioned bearing in the outer end of said drive shaft housing, snap ring means engaging the other bearing supporting said second shaft and the shaft for axially locating said last mentioned bearing on said second shaft, and a second gear keyed to said second shaft and meshing with said first gear whereby said snap ring means in the outer end of said drive shaft housing may be removed for permitting removal of the entire assembly of said drive shaft, both of its bearings and its gear from said drive shaft housing may be removed for permitting removal of the entire assembly of said drive shaft, both of its bearings and its gear from said drive shaft housing, said snap ring means in the outer end of said drive shaft housing determining the mesh of said second gear relative to said first gear.

5. A transmission comprising a gear housing, a drive shaft housing extending laterally therefrom, a first shaft in said gear housing, a second shaft in said drive shaft housing, a pair of bearings cooperating with each of said housings for supporting each shaft, snap ring means engaging said gear housing and one of said bearings supporting said first shaft for axially locating said shaft in said gear housing, snap ring means engaging the other bearing supporting said first shaft and the shaft itself for axially locating said last mentioned bearing on the shaft, a first gear keyed to said first shaft whereby said second bearing may be removed with said first shaft from said gear housing and said first shaft may be removed from said first gear leaving said first gear in said gear housing so that the gear, after the shaft is removed, may be removed from said gear housing, snap ring means engaging one of said bearings supporting said second shaft, said second shaft and said drive shaft housing for axially locating said last mentioned bearing in the outer end of said drive shaft housing, snap ring means engaging the other bearing supporting said second shaft for axially locating said last mentioned bearing on the shaft, and a second gear keyed to said second shaft and meshing with said first gear whereby said snap ring means in the outer end of said drive shaft housing may be removed for permitting the entire assembly of said drive shaft, both of its bearings and its gear from said drive shaft housing, said snap ring means in the outer end of said drive shaft housing comprising a pair of snap rings engaging said drive shaft housing and said first bearing supporting said second shaft, removal of the outer one permitting partial removal of the drive shaft assembly whereupon the inner snap ring may be removed and then the entire assembly may be withdrawn from said drive shaft housing.

References Cited in the file of this patent

UNITED STATES PATENTS

| | | |
|---|---|---|
| 2,476,586 | Darash | July 19, 1949 |
| 2,604,795 | Ristow | July 29, 1952 |
| 2,697,362 | Keesling | Dec. 21, 1954 |
| 2,710,763 | Gilbert | June 14, 1955 |
| 2,791,912 | Bixby | May 14, 1957 |

FOREIGN PATENTS

| | | |
|---|---|---|
| 1,057,128 | France | Oct. 28, 1953 |
| 1,001,034 | Germany | Jan. 17, 1957 |